United States Patent
Hartka

[11] Patent Number: 5,878,664
[45] Date of Patent: Mar. 9, 1999

[54] PRINTING SYSTEM AND METHOD

[76] Inventor: Theodore J Hartka, 16 Glenbrook Dr., Phoenix, Md. 21131

[21] Appl. No.: 893,004

[22] Filed: Jul. 15, 1997

[51] Int. Cl.$^6$ ................................. B41N 1/12; B41F 5/00
[52] U.S. Cl. ..................... 101/216; 101/395; 101/401.1; 101/478
[58] Field of Search .................... 101/216, 368, 101/375, 395, 401.1, 478

[56] References Cited

U.S. PATENT DOCUMENTS

| | | | |
|---|---|---|---|
| 3,654,864 | 4/1972 | Ovshinsky | 101/478 |
| 4,718,340 | 1/1988 | Love, III | 101/116 |
| 5,154,121 | 10/1992 | Schneider | 101/401.1 |
| 5,213,040 | 5/1993 | Mihori et al. | 101/424 |
| 5,511,477 | 4/1996 | Adler et al. | 101/401.1 |
| 5,705,316 | 1/1998 | Steinmann et al. | 430/269 |
| 5,706,733 | 1/1998 | Bichler | 101/487 |

*Primary Examiner*—Edgar Burr
*Assistant Examiner*—Amanda B. Sandusky
*Attorney, Agent, or Firm*—William E. Mouzavires

[57] ABSTRACT

A printing system has a print cylinder on which a raised printing surface is formed in situ preferably by a "rapid prototyping" or "fused deposition modelling" machine operating with electronic images from a computer image processing system. After a printing operation has been completed, and it is necessary to print another image for the next printing operation, the former printing surface is removed in situ from the print cylinder by abrading, scraping, cutting, etc. and the next printing surface with the new image is formed in situ on the same printing cylinder in the same manner described above.

13 Claims, 2 Drawing Sheets

PRINTING SYSTEM AND METHOD

FIELD OF THE INVENTION

The present invention generally relates to printing systems and methods and more specifically to methods and apparatus for forming printing surfaces used for printing images in printing machines. Although the present invention is particularly suitable for rotary printing cylinders, the invention need not be so limited but will have applicability elsewhere.

BACKGROUND OF THE INVENTION

Several existing printing systems utilize a printing plate in which the areas to print are raised above the areas that are not to be printed. The difference in height of the two levels is called "relief" in the printing field. The amount of relief required is largely dependent on the material to be printed. Media which has little variation in thickness and which can be well controlled need little relief while less precise materials require more relief. An example of highly precise media is magazine grade paper printed in a web. Less precise media is represented for example by corrugated paperboard printed in association with a sheet feeding apparatus. In any case, the required relief is not large. Corrugated paperboard is commonly printed with 1 mm (0.040") relief.

On rotary printing machines, there are several ways to create a print cylinder with these types of printing and non printing areas. One method uses replaceable cylinders that are machined with machine tools. Another method utilizes printing plates that are formed photographically in a flat form, glued to a carrier sheet and then mounted to a cylinder which is sufficiently smaller than the desired printing diameter to account for the thickness of the plate and the carrier sheet. The assembly of the plate, the carrier sheet and provision for mounting it on the cylinder is called a printing blanket. The latter system is the one commonly used to print in machines for making corrugated boxes.

In either case, the cylinder or blanket must be installed and removed for each print job. They must be cleaned and stored between runs of the print job. Changes in the image to be printed involve reworking the cylinder or blanket.

Variations in the thickness of the materials used to make the blanket, plate, adhesive and carrier sheet, can cause the overall thickness of the blanket assembly to vary considerably thereby causing the printing surface to vary from the desired cylindrical surface.

OBJECTS AND ADVANTAGES OF THE PRESENT INVENTION

An object of the present invention is to provide a novel method and apparatus for forming a print surface in a printing machine and which will overcome several of the aforementioned drawbacks of prior methods and apparatus.

Another object of the present invention is to provide a novel method and apparatus for forming a print surface in situ in a printing machine or other printing apparatus. Included here is such method and apparatus that may be used to quickly change the printing surface in a printing machine without disassembling the printing cylinder or other printing member of the printing machine.

A further object of the present invention is to provide such a method and apparatus for forming a printing surface in an automated manner utilizing electronic images such as from a computer image processing system, and a device that constructs the printing surface using the electronic images of the computer image processing system.

A still further object of the present invention is to provide such a method and apparatus as discussed above and which may also be applied to conventional printing machines such as those which utilize a rotary print cylinder.

Other advantages of the present invention include the following:

The print job can be started as soon as the electronic image of the desired printing is available instead of waiting for the cylinder of blanket to be prepared, usually at a remote site.

There is no need to warehouse and maintain cylinders or blankets.

There is no penalty for changing the print on successive runs of the same job.

It is possible to change the printing quickly by stopping printing, removing a part of the plate and replacing it with new printing. Thus, in a long run, many small groups of product can be produced with different information or illustration as long as the basic parameters of the run do not change. In the case of boxmaking, in a long run of boxes for a specific product, groups of these boxes could be printed indicating the different colors or model numbers of the product to be packaged.

The system of this invention can be completely automated to avoid manual mounting and dismounting of cylinders and blankets which disrupts the manufacturing process and causes unpredictable delays.

In one possible configuration with four printing stations, all printing could be done utilizing the four color process method wherein all colors are produced by printing small dots of four basic colors, usually cyan, magenta, yellow and black. Using the method of the present invention, it would not be necessary to change the ink between print jobs.

Even though all components of conventional blankets are made to close tolerances, the overall thickness of the combination can have significant variation. By creating the printing surface in place and, if necessary truing it, the printing surface can be made exceptionally concentric for optimum printing.

SUMMARY OF PREFERRED EMBODIMENTS OF THE PRESENT INVENTION

For purposes of illustration only, the description below will be for a method and machine used to print corrugated board used to make boxes. It will be understood that the invention may be practiced with any printing method or machine that utilizes printing surfaces with "relief".

In the preferred form, the method includes the steps of constructing and configuring in situ on a printing member such as a print cylinder, a raised printing surface. The surface is configured to present the desired image to be printed on the board preferably by means of an automated "rapid prototyping" device or a "fused deposition modelling device" which deposits the surface with a predetermined configuration in accordance with electronic images as may be provided by a computer image processing system connected to the device. In order to change the printing surface for the next printing job requiring a different image to be printed, the first surface is removed from the print cylinder in situ in any suitable manner such as by scraping, abrading, cutting etc.

A printing machine utilizing foregoing method would include:

A print cylinder whose diameter is less than the desired printing diameter by twice the relief. The material of the surface of the print cylinder is such as to allow the raised printing surface material to adhere to it.

A conventional impression cylinder, that is, a cylinder that holds the material to be printed such as the corrugated board, in contact with the printing surface.

Conventional systems to convey the sheet through the printing machine.

A conventional inking system to apply a controlled amount of ink to the printing surface as it revolves. By way of example only, one such system is a flexographic, chambered doctored blade system.

In accordance with the preferred form of the invention a carriage is used to move the material depositing device back and forth along the print cylinder. Another carriage holds a tool for machining, scraping, cutting and/or abrading the printing surface to remove it at the end of a printing run and ready the print cylinder for receiving the next printing surface for the next printing job. It may also be used to trim the printing surface material after deposition, if necessary, to provide a uniform, concentric surface for printing. This can include an apparatus for removing debris, such as a vacuum system.

If the material is thermoplastic, the cylinder or the material may be heated to assist in removal of the material. Also the printing surface may be made concentric, if needed, by a heated roller instead of the machining, cutting, scraping and abrading devices.

DRAWINGS

Other objects and advantages will become apparent from the following detailed description taken in conjunction with the attached drawings in which:

FIG. 1 is a side view of a printing machine constituting a preferred embodiment of the present invention; and FIG. 2 is a front elevational view of the machine with certain parts removed.

DETAILED DESCRIPTION

Figure 1:
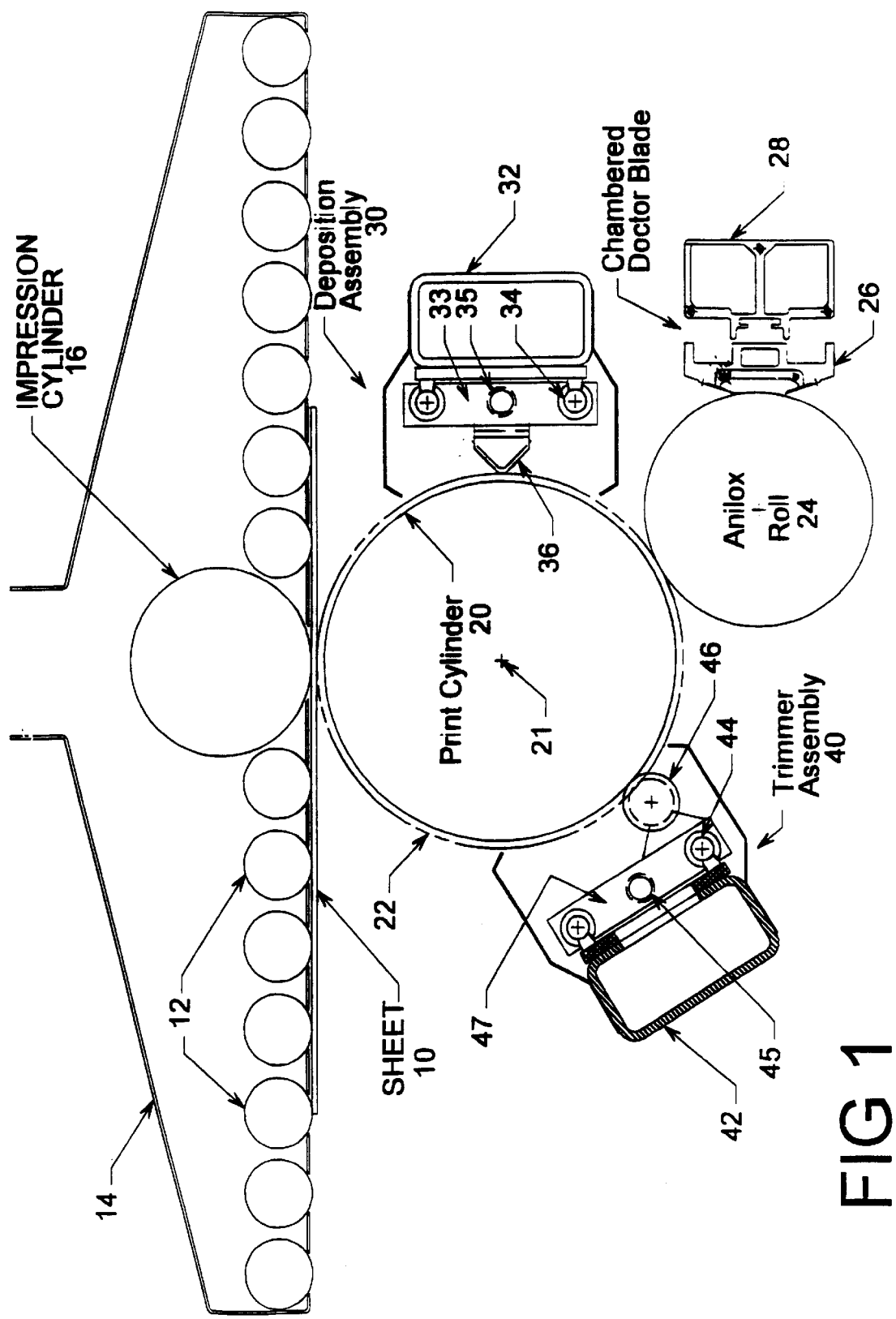
Figure 2:
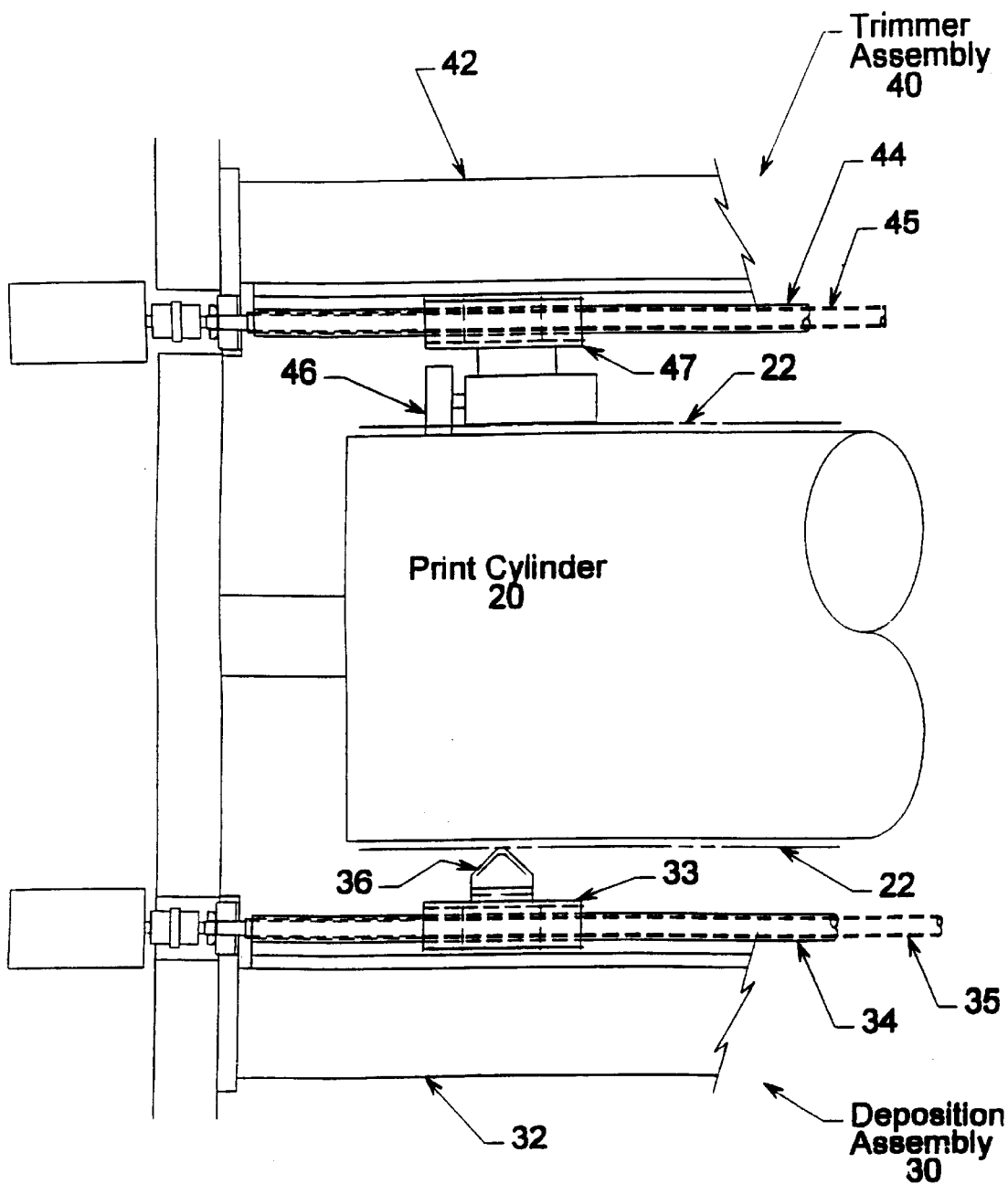

Referring now to the drawings in detail, there is shown for illustrative purposes only apparatus including a machine constituting a preferred embodiment of the present invention for carrying out a preferred method of the present invention. The printing machine is used to print images on a sheet 10 such as, for example, corrugated board while it is held on a transport conveyor including a plurality of rolls 12 which are rotatable to transport the sheet 10 over the surface of a print cylinder generally designated 20. The sheet 10 is held against rolls 12 by a vacuum generated in the space enclosed by a hood 14. In the specific embodiment shown, an impression cylinder 16 is located in the hood 14 above the print cylinder 20 so as to provide a nip through which the sheet passes while it is receiving an image from the print cylinder 20. Although in the specific embodiment shown, the sheet 10 is shown being transported above the print cylinder 20, it will be understood that the sheet may be transported below the print cylinder 20 in other embodiments not shown. In the case of flexible materials, they may partially wrap around the impression cylinder 16. Similarly, the present invention need not be limited to printing corrugated board but will have applicability to other sheet or flexible web materials to be printed.

Except for the raised printing surface 22 formed on the print cylinder 20 in accordance with the invention to be described below, the main body of the print cylinder 20 may be conventional and needs no further description as such cylinders are well known in the art. However the diameter of the print cylinder 20 is chosen so as to account for the print surface 22 which will be formed thereon in relief as will be described. Also the surface of the print cylinder 20 must be formed of a material that will allow the printing surface 22 to adhere to it. Thus in the embodiment utilizing a thermoplastic print surface material, the surface of the print cylinder 20 must be compatible with the thermoplastic material to allow it to adhere to it.

Ink is supplied to the print cylinder in any suitable or conventional manner such as through the roll 24 which is supplied with ink from a head 26 which extends across the face of roll 24. Head 26 is mounted to beam 28.

In the preferred embodiment, the print surface 22 is deposited on the surface of the print cylinder 20 in a single layer or successive layers one above the other by means of a fused deposition modelling device generally designated 30 which includes a deposition head 36 movable back and forth along the surface of print cylinder 20 to deposit a flowable material, preferably thermoplastic, in one or successive layers on the surface of the print cylinder 20. During the deposition of the material on the print cylinder 20, the print cylinder is turned about its axis 21 by a servo drive motor in order to bring the desired area into position with respect to the deposition head 36. The deposition head 36 is positioned across the face of print cylinder 20 by means of a lead screw 35 which is driven by a servo drive motor. The movements of the print cylinder 20 and deposition head 36 are controlled by the output of the computer image processing system. One such fused deposition modelling device that may be utilized is that for example made by Stratasys. Another similar device that may be employed is the ACTUA 2100 Multi-jet modelling device made by 3D Systems. Such devices are also known as "rapid prototyping" devices. The material is extruded from head 36 and quickly solidifies upon deposition on the print cylinder 20. The shape of the deposited material is controlled and governed by electronic images produced preferably by a computer image processing system operatively connected to the input of the device 30 and the cylinder 20. In the field of corrugated paperboard, the corrugated board 10 is printed with 1 mm (0.040 inches) relief, which is to say that the printing surface 22 is raised from the surface of the print cylinder 20 by 1 mm or 0.040 inches.

In the specific embodiment shown where the printing member 20 is a rotary print cylinder, the deposition head 36 is mounted on a carriage 33 which in turn is slidably mounted on parallel guide rails 34 for movement along the guide rails 34 longitudinally of and alongside the print cylinder 20 and such motion is controlled by lead screw 35. Guide rails 34 are suitably fixed to elongated support channel 32 as shown in FIG. 1.

After the printing surface 22 is applied to the print cylinder by means of the deposition head 36 as just described, the head 36 is deactivated and the print cylinder 20 is ready for a printing operation. The deposition head 36 is moved away from the printing surface 22 during printing either radially or axially. After a particular printing job is completed, and it is desired to apply another printing surface 22 with a different configuration to the print cylinder 20, the previously applied printing surface 22 is removed in any suitable manner such as by scraping, abrading, or cutting it away from the surface of the print cylinder 20 until the latter is restored to its original diameter. In the specific embodiment shown, a tool 46 for removing the print surface 22 is shown mounted to a carriage 47 which in turn is slidably mounted on parallel rails 44 fixed to an elongated support channel 42 to extend along the print cylinder. The carriage 47 is moved along the rails 44 by lead screw 45 which is driven by a motor. When the machine is printing, the removal tool 46 is positioned away from the printing surface 22 either radially or axially. If the tool 46 is also to be used to trim the printing surface 22 after deposition, it must have two radial positions. One tangent of the surface of the cylinder 20 for removal and one tangent to the printing surface 22 for trimming. Although the tool 46 is shown as an abrader, a scraping, cutting or any other suitable tool may be employed in its place. Also the print cylinder 20 may also be heated to assist in the removal of the print surface 22 in cases where the latter is formed from thermoplastic material.

After the previous printing surface 22 has been removed by the tool 46, the deposition head 36 may then be activated to apply a new printing surface 22 to the print cylinder 20 for the next printing operation. In some cases, it is desirable to remove only a portion of the printing surface 22 and reform that area with the deposition head 3 This is easily accomplished by appropriate control of the removal tool 46 and the deposition head 36.

It will be seen from the above that the removal of the prior printing surface 22 and the application of a new printing surface 22 are effected without shutting down or disassembling the print cylinder 20 or associated parts of the printing apparatus. Also precise shapes can be quickly imparted to the printing surface 22 through means of the computer image processing system and the associated deposition device 36.

Although preferred embodiments of the present invention have been shown and described above, it will be understood that the invention is not limited to these specific embodiments shown but rather the scope of the invention is indicated in the appended claims.

I claim:

1. A method of relief printing including forming a printing surface in relief on a printing member of a printing machine, comprising the steps of:

constructing a first printing surface in situ on and raised from the printing member by depositing a flowable thermoplastic material on to the printing member in a predetermined configuration corresponding to an image to be printed and allowing it to solidify and adhere to the printing member to form the printing surface, completing a printing operation, removing the first printing surface in situ from the printing member without disassembling the printing member from the printing machine, and then constructing in the same manner defined above but with a new supply of flowable thermoplastic material a second printing surface in situ on the printing member for use in a subsequent printing operation and wherein there is further included the steps of constructing the printing surface on the printing member using a fused deposition modeling device which deposits the flowable material on the printing member as the device moves along the printing member, and using a computer image processing system to control the deposition of the material.

2. The method defined in claim 1 including the step of removing the printing surface from the printing member in situ by the step selected from the group consisting of scraping, abrading or cutting.

3. The method defined in claim 2 applied to printing images on corrugated board with a rotary print cylinder which is the print member in the printing machine.

4. The method defined in claim 1 including the step of depositing the flowable material in successive layers one above the other.

5. The method defined in claim 1 wherein the printing surface is raised from the printing member a distance of about 0.04 inches.

6. A method of forming a printing surface on a printing member of a printing machine for relief printing comprising the steps of depositing in situ on the printing member a flowable thermoplastic material with a predetermined configuration, and allowing the material to solidify into the predetermined configuration on the surface of the printing member, and wherein there is further included the steps of using a fused deposition modeling machine to deposit the flowable plastic material and using a computer image-processing system to provide electronic images for configuring the thermoplastic material as it is being deposited on the printing member.

7. The method defined in claim 6 applied to a rotary print cylinder of a printing machine.

8. The method defined in claim 6 including the step of depositing of flowable material in successive layers one above the other.

9. A printing machine for relief printing including a printing member for printing images, first means for depositing a flowable thermoplastic material in a predetermined configuration on the printing member corresponding to an image to be printed, said flowable thermoplastic material being solidifiable into a printing surface raised from a surface of the printing member, and second means for removing the printing surface from the printing member after a printing operation, said printing member being reusable to receive a new printing surface once a previous printing surface is removed by said second means and wherein said first means includes a computer image processing system for producing electronic images for controlling the deposit of said flowable material to obtain the predetermined configuration and, a fused deposition modeling machine which deposits the thermoplastic flowable material in layers one above the other.

10. The machine defined in claim 9 wherein said second means includes a carriage movable along the printing member and a tool on the carriage to engage the printing surface as the carriage moves along the printing member.

11. The machine defined in claim 10 wherein said first means includes a carriage movable along the printing member for depositing said flowable material on the printing member in successive layers as the carriage moves along the printing member.

12. The machine defined in claim 11 wherein said printing member is a rotary cylinder.

13. The machine defined in claim 9 wherein said first means deposits said flowable material in successive layers one above the other and means for controlling the deposit to obtain the predetermined configuration.

* * * * *